July 28, 1964 F. A. LITZ 3,142,821

MATRIX ENERGIZING SYSTEM

Filed June 12, 1958 2 Sheets-Sheet 1

INVENTOR.
FRANK A. LITZ

BY Robert H. Fraser

ATTORNEY

July 28, 1964 F. A. LITZ 3,142,821

MATRIX ENERGIZING SYSTEM

Filed June 12, 1958 2 Sheets-Sheet 2

INVENTOR.
FRANK A. LITZ

BY Robert H. Fraser

ATTORNEY

United States Patent Office 3,142,821 Patented July 28, 1964

3,142,821 MATRIX ENERGIZING SYSTEM

Frank A. Litz, San Jose, Calif., assignor to International Business Machines Corporation, New York, N.Y., a corporation of New York Filed June 12, 1958, Ser. No. 741,479
5 Claims. (Cl. 340—173)

This invention relates to matrix information storage and switching systems and more particularly to an improved system for applying input signals to a plurality of information storage or switching elements connected in a matrix.

In data processing and digital computer systems it is well known to connect a plurality of information storage or switching elements in a matrix in which each individual element may be selectively energized by applying signals to selected ones of two groups of conductors between which are connected the switching elements. Some types of switching elements which may be employed in a matrix appear as capacitors which, when charged to a predetermined level, effect a switching or information storage function. In order to achieve a predetermined level of charge of a capacitor where relatively short electrical pulses are applied, a relatively high current is required.

Accordingly, where an information storage or switching matrix comprising capacitor type elements is employed in a data processing system operating synchronously with a source of clock pulses appearing at a relatively high repetition rate, the information pulses must correspondingly be of relatively short duration. Therefore, the amplitude of the pulses, that is, the peak current, must be relatively high to effect the desired actuation of a particular capacitor-type switching element during the period in which the information pulse is applied to the selected pair of conductors of a matrix.

Accordingly, it is a primary object of the invention to provide a system for energizing a plurality of capacitor-type information storage or switching elements in which the peak current required to actuate the elements is reduced.

It is another object of the present invention to provide a new and improved information storage system in which a plurality of capacitor elements connected in a matrix are energized from a source of serially appearing information.

It is a still further object of the present invention to provide a new and improved information storage or switching circuit in which the energizing pulses are extended in time to lower the required peak charging current.

It is yet another object of the present invention to provide a new and improved information storage or switching circuit in which a plurality of capacitor elements are connected in a matrix, a plurality of pulses extended in time are applied to the matrix for actuating the capacitor elements, and the capacitor elements are disconnected upon reaching a predetermined level of charge.

Briefly, in accordance with the invention, a plurality of capacitor elements for storing information or performing a switching function are connected in a matrix between a plurality of bit lines and a plurality of character lines by means of which selected ones of the elements may be actuated. A plurality of bit line drive circuits are connected to the bit lines for extending information pulses derived from a serial information source so that selected ones of the elements connected between the bit lines and character lines receive a current for an extended period. Ambiguity in entering information into the matrix by means of extended pulses is avoided by employing at least two groups of character lines, each of which is associated with a separate group of bit lines so that the selected capacitor elements are charged for an extended time with no two elements being connected to a common bit line receiving information pulses at the same time.

An additional feature of the invention is the inclusion of devices between the capacitor elements and the bit lines whereby the elements are automatically disconnected from the bit lines upon being charged to a predetermined level.

A better understanding of the invention may be had from a reading of the following detailed description and an inspection of the drawings, in which.

Figures 1, 1A, 3:
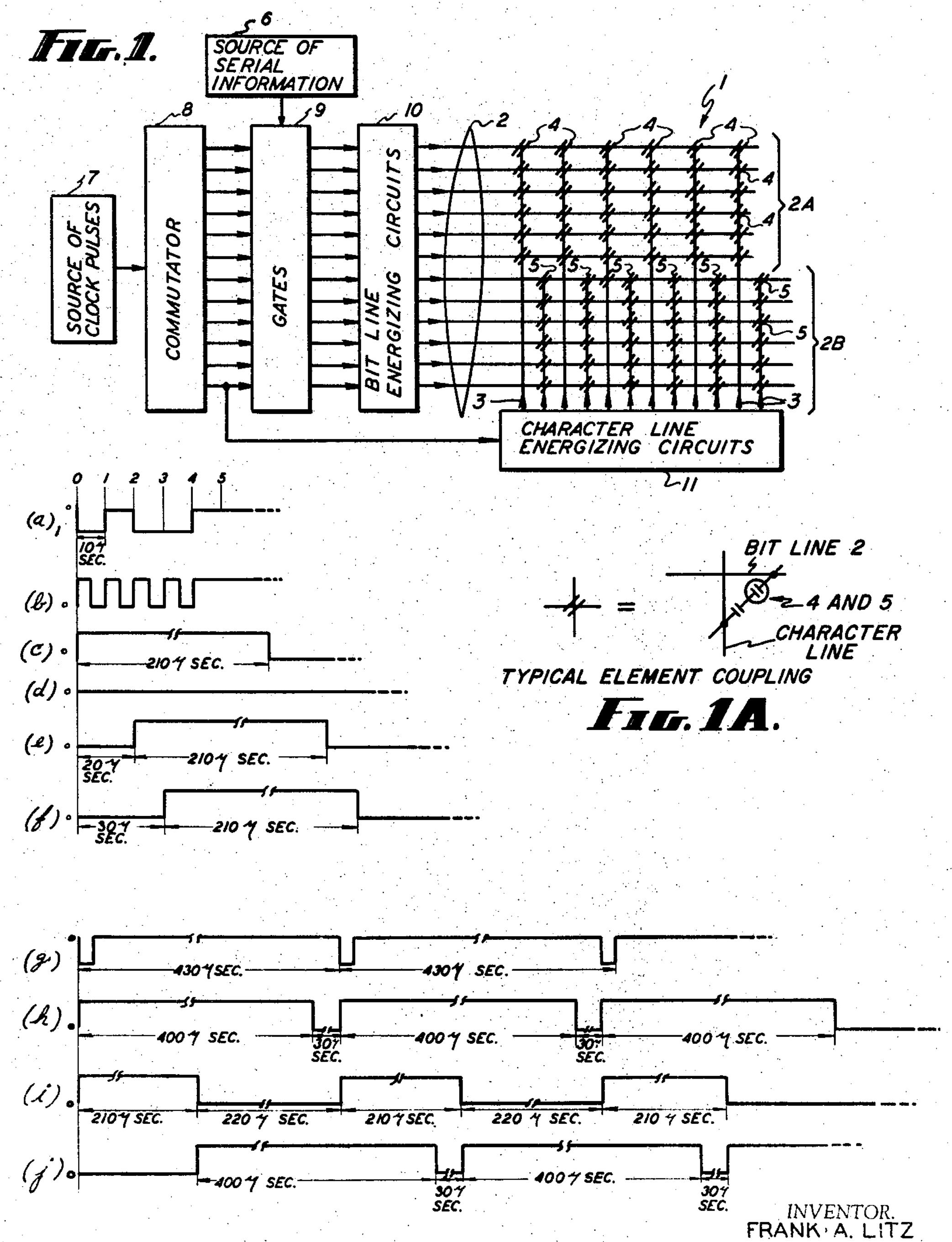
FIG. 1 is a block and schematic circuit diagram of a matrix energizing system in accordance with the invention, including a schematic diagram FIG. 1A representing the arrangement of an individual matrix element.
FIG. 3 is a set of graphical illustrations representing various voltages and currents appearing in the apparatus of FIG. 2.

In FIG. 1 there is shown a system for energizing a plurality of capacitor elements connected in a matrix 1 which includes a plurality of bit lines 2 in the form of horizontal crosspoint connections and a plurality of character lines 3 in the form of vertical crosspoint connections. The bit lines 2 are divided into at least two groups, 2A and 2B, with capacitor elements 4 being connected between the upper group of bit lines 2A and a first set of character lines 3, and other capacitor elements 5 being connected between the lower group of bit lines 2B and a second set of character lines illustrated as being interspersed between the first set of character lines. For convenience, not all of the capacitor elements have been designated by a reference character on the drawing, but it will be understood that a capacitor element is connected at each intersection between a bit line and a character line at which a pair of oblique lines appears on the drawing. FIG. 1A illustrates in detail the manner in which a coupling may be made between a bit line 2 and a character line 3 to an individual one of the capacitor elements 4 or 5. The capacitor elements may take the form of conventional capacitor-actuated switches or storage elements in which the element is switched from one state to another state in response to the charging of the capacitor.

One particular type of capacitor element adapted to produce a mechanical motion when energized may be employed to operate miniature light shutters in a data processing memory system. This type of capacitor element appears as approximately a .03 to .08 microfarad capacitor and requires a discrete energy level of the order of one milliwatt-second for actuation. Devices of this nature are sold, for example, under the trademark "Capaswitch" by the Mullenbach Division of Electric Machinery Manufacturing Company. Since energy stored in a capacitor in watt-seconds equals ½ $CV^2$ where C is in farads and V is in volts, it may be derived that the capacitor of the switching element must be changed to approximately 200 volts for actuation. Where the matrix 1 is to receive serial information in the form of an electrical signal train having a 100 kilocycle pulse per second rate, each digital position in which a "bit" of information appears has a duration of 10 microseconds so that an information pulse applied to a particular capacitor element would be required to have a peak current approaching 2 amperes to actuate the selected capacitor element. Such a peak current requires a drive circuit which would normally include relatively costly, high plate dissipation rated electron tubes in order to handle such a high current for such a short length of time.

Since the peak charging current is inversely proportional to the time constant of the charging circuit, the charging current may be considerably reduced by increasing the length of the charging pulse, i.e., allowing a longer time interval for the charging or actuation of a switching element. Increasing the length of the charging pulse allows the costly components required in a high current capacity drive circuit to be replaced by less expensive circuit components having a capacity to deliver a smaller current for a longer period of time.

In the apparatus of FIG. 1 an electrical signal train representing binary serial information is supplied from a source of serial information 6. The digital positions of the signal train in which each "bit" of information appears consecutively in time may be synchronized with a timing pulse train derived from a source of clock pulses 7. The source of clock pulses 7 may be employed to drive a commutator 8 which sequentially energizes one by one a plurality of output leads which are connected to a like plurality of gates 9 which receive the electrical signal train from the source of serial information 6. The pulses appearing on the leads from the commutator 8 function to open the gates 9 in sequence to allow the signals appearing in each digital position of the electrical signal train from the source of serial information 6 to be passed to separate ones of the bit line energizing circuits 10. The bit line energizing circuits 10 function to generate an extended length pulse in response to each binary signal of a given value passed by the gates 9 which is applied to a corresponding one of the bit lines 2 of the matrix 1. Since the extended length pulses from the bit line energizing circuits may be substantially longer than the time interval allotted to a digital position in the electrical signal train from the source of serial information 6, a number of the bit lines 2 may be energized at any given time.

The actuation of a particular capacitor element of the matrix 1 is determined by a coincidence of an extended length pulse on a particular bit line and a corresponding circuit connection or energization of a particular character line between which is connected the selected capacitor element. By means of the character line energizing circuits 11, circuits may be completed to selected ones of the character lines 3 to allow each of the capacitor elements 4 and 5 to be charged by the extended length pulses appearing on the bit lines 2. The character line energizing circuit 11 may be arranged to energize the vertical crossbar connections commencing from left to right at appropriate times under the influence of a signal taken from the last position of the commutator 8 so that the information in the signal train from the source of serial information 6 may be entered in the capacitor elements 4 and 5 of the matrix 1.

Since the extended pulses from the bit line energizing circuits overlap in time, with more than one bit line receiving an extended length pulse at any given time, arrangement is made in the system of the invention to eliminate the possibility of more than one capacitor element being actuated by a single bit of information by dividing the bit lines 2 into at least two groups which in FIG. 1 comprise an upper group 2A and a lower group 2B, each served by separate character lines 3. Thus, the character line energizing circuits 11 energize a single character line connected to the upper capacitor elements 4 during the period in which the upper bit lines 2A receive extended length pulses from the bit line energizing circuits 10 and the character line energizing circuits 11 energize a single character line connected to the lower capacitor elements 5 during the period in which extended pulses are applied to the lower bit lines 2B from the bit line energizing circuits 11.

By arranging the bit line energizing circuits 10 to generate extended length pulses having a duration less than one-half the number of bit lines multiplied by the time interval allotted to a digital position in the information signal train, and by arranging the character line energizing circuits to energize the character lines only for as long as the corresponding bit lines are energized, no two character lines associated with the same group of bit lines are energized at the same time so that only a single capacitor element is actuated by any given bit of information.

Accordingly, in operation, adjacent ones of the character lines may be energized without producing an ambiguous entry of information in the matrix since no two character lines associated with the same group of bit lines are energized at the same time. Therefore, the extension of the information pulses on the bit lines and the corresponding energizing of the character lines allows a substantial increase in the charging time of each capacitor element, even though the time interval allotted to a digital position in the information signal train is very short.

Figure 2:
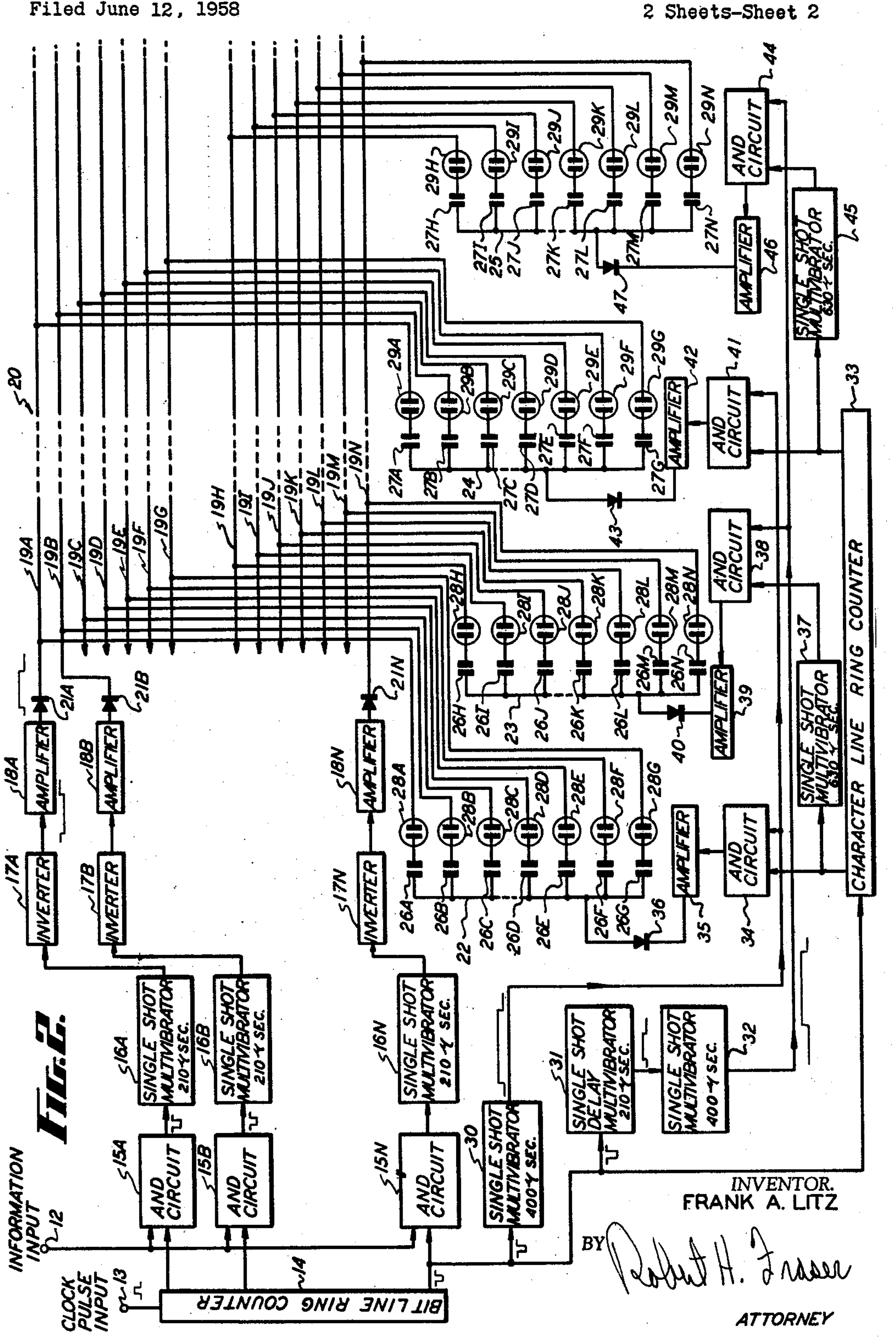
FIG. 2 is a combined block and circuit diagram of a portion of a particular matrix energizing system in accordance with the invention.

FIG. 2 illustrates a particular arrangement of a system for energizing a plurality of capacitor elements in a matrix employing the principles discussed above in connection with FIG. 1. In the system of FIG. 2, an electrical signal train representing serial binary information may be applied to a terminal 12 and timing pulses coincident with the digital positions of the information signal train may be applied to a terminal 13. A ring counter 14 connected to the terminal 13 functions as a commutator which steps from position to position in response to the timing pulses to energize sequentially a plurality of "AND" circuits 15A–15N which function as gates.

In the arrangement of FIG. 2 the "AND" circuits 15A–15N are sequentially rendered capable of passing the information contained in the electrical signal train in each successive digital position to a separate bit line energizing circuit. The bit line energizing circuits each include a single shot, i.e., monostable, multivibrator 16A–16N which functions to generate a pulse of extended duration in response to a signal of a given binary value passed by its associated "AND" circuit 15A–15N. The extended length pulses from the single shot multivibrators 16A–16N are passed to the inverters 17A–17B which function as polarity reversers and which in turn apply signals to the amplifiers 18A–18N. The amplified extended length pulses from the amplifiers 18A–18N are applied to the bit lines 19A–19N of a matrix 20 via the diodes 21A–21N which are driven to full conduction by the amplified pulses.

Although the arrangement of FIG. 2 may include any number of bit lines, for convenience of illustration only fourteen bit lines and three energizing circuits have been illustrated. In one workable embodiment forty-two bit lines connected to a corresponding number of bit line energizing circuits were employed with each single shot multivibrator 16A–16N having a period equal to a time interval encompassing twenty-one digital positions of the electrical signal train applied to the terminal 12, i.e., 210 microseconds.

The matrix 20 of FIG. 2 includes a plurality of character lines 22–25 which may be energized to actuate selected ones of a plurality of capacitor elements connected between the character lines and the bit lines 19A–19N. The dashed portions of the character lines 22–25 are intended to indicate that any number of capacitor switching elements may be connected to a single character line so long as the number does not exceed one-half the number of bit lines.

Even-numbered ones of the character lines 22–25 are connected to capacitor elements which may be energized from an upper group of bit lines 19A–19N and odd-numbered ones of the character lines 22–25 are connected to capacitor elements which may be energized from a lower group of bit lines 19A–19N. Accordingly, between the first character line 22 and the upper group of bit lines 19A–19G are connected the capacitor elements 26A–26G, between the second character line 23 and the lower group of bit lines 19H–19N are connected the capacitor elements 26H–26N, between the third character line 24 and the upper group of character lines 19A–19G are connected the capacitor elements 27A–27G, and between the last character line 25 and the lower group of character lines 19H–19N are connected the capacitor elements 27H–27N.

Connected serially with each of the capacitor elements 26A–26N and 27A–27N is an isolating device comprising a neon tube (or vacuum diode) 28A–28N and 29A–29N. Each of the isolating devices functions to disconnect its associated capacitor element when the capacitor element reaches a predetermined level of charge as described in detail below.

The character lines 22–25 receive energizing pulses of a polarity which allows selected ones of the capacitor elements 26A–26N and 27A–27N to be actuated by the extended length energizing pulses from the bit line energizing circuits. In order to generate extended length pulses for application to the even-numbered character lines associated with the upper group of bit lines 19A–19G, a single shot multivibrator 30 receives a pulse from the last stage of the bit line ring counter 14 and generates an output pulse having a length of the order of the time interval in which extended length energizing pulses may be applied to all of the upper group of bit lines 19A–19G. For example, where the matrix 20 includes forty-two bit lines, twenty-one of which comprise the upper group, and a digital position in the electrical signal train applied to the input terminal 12 has a duration of 10 microseconds, the length of the extended length pulses generated by the bit line energizing circuit multivibrators 16A–16N may be equal to 210 microseconds and the extended length pulse from the single shot multivibrator 30 for application to the even-numbered character lines may have a length of 400 microseconds.

Delayed extended length energizing pulses for application to the odd-numbered bit lines may be generated by applying a pulse from the last stage of the bit line ring counter 14 to a single shot delay multivibrator 31 and a single shot multivibrator 32 connected in cascade so that the single shot multivibrator 32 is energized by the negative going excursion, i.e. the trailing edge of the pulse from the single shot delay multivibrator 31. The time period of the single shot multivibrator 32 may be equal to the time period of the single shot multivibrator 30 and the period of the single shot delay multivibrator 31 may be equal to one-half the number of bit lines times the interval of a single digital position. Thus, in the matrix described above employing forty-two bit lines and a digital position of 10 microseconds, with bit line energizing circuits arranged to generate extended length pulses of 210 microseconds, the single shot delay multivibrator 31 may have a period of 210 microseconds and the single shot multivibrator 32 may have a period of 400 microseconds.

A character line ring counter 33 receives a pulse from the last stage of the bit line ring counter and functions to control the gating of the extended length character line energizing pulses from the single shot multivibrators 30 and 32 to the character lines 22–25. Thus, in its first position the character line ring counter opens a gate in the form of an "AND" circuit 34 to pass the extended length energizing pulse from the single shot multivibrator 30 to an amplifier 35, which in turn applies an energizing pulse to the character line 22 via a diode 36. During the period in which the character line 22 is energized, selected ones of the capacitor elements 26A–26G may be energized by the application of an extended length energizing pulse to corresponding ones of the bit lines 19A–19G. During the charging of the capacitor elements 26A–26G, the isolating devices 28A–28G are rendered conducting and when the selected capacitor elements 26A–26G reach a predetermined level of charge, the voltage across the isolating devices 28A–28G drops to a level at which conduction therethrough is extinguished so that the capacitor elements are disconnected from the bit lines and bit line energizing circuits.

In order to gate the delayed extended length energizing pulses from the single shot multivibrator 32 to the odd-numbered character line 23, a signal from the first position of the character line ring counter 33 may be applied to a single shot multivibrator 37 which opens a gate in the form of an "AND" circuit 38 to apply the delayed extended length pulses to an amplifier 39. The amplified energizing pulse from the amplifier 39 is applied to the character line 23 via a diode 40 so that any selected one of the capacitor elements 26H–26N may be energized from the lower group of bit lines 19H–19N. Where the time interval of a digital position and the periods of the multivibrators 30 and 32 are as set forth above, the single shot multivibrator 37 may have a period of 630 microseconds.

As before, the isolating devices 28H–28N are arranged to disconnect the actuated capacitor elements from the bit lines when the capacitor elements have reached a predetermined level of charge at which time the voltage across the isolating devices falls below a level which is capable of sustaining current flow.

When the bit line ring counter 14 has stepped through its entire sequence, the character line ring counter 33 is advanced one position to open a gate in the form of an "AND" circuit 41 to pass extended length pulses from the single shot multivibrator 30 to an amplifier 42, which passes an amplified signal to the character lines 24 via a diode 43 to enable the capacitor elements 27A–27G to be actuated by extended length energizing pulses appearing in the upper group of bit lines 19A–19G with the isolating devices 29A–29G disconnecting the capacitor elements from the bit lines after actuation.

In a manner similar to that described above, the odd-numbered bit line 25 will receive delayed extended length energizing pulses from the single shot multivibrator 32 via and "AND" circuit 44 which receives a gating signal from a single shot multivibrator 45 which may have the same period as the single shot multivibrator 37. The pulses from the "AND" circuit 44 are passed to the character line 25 via an amplifier 46 and a diode 47 to enable the capacitor elements 27H–27N to be actuated by extended length energizing pulses appearing in the lower group of bit lines 19H–19N. As before, the isolating devices 29H–29N function to disconnect the capacitor elements from the bit lines after actuation.

Although only two even-numbered character lines 22 and 24 and two odd-numbered character lines 23 and 25 have been illustrated in FIG. 2, any number of character lines and any number of corresponding capacitor elements may be included as indicated by the dashed break in the bit lines and the character line energizing circuit between the character lines 23 and 24. Thus, by increasing the number of character lines and the number of capacitor elements, any quantity of digital information may be entered in the matrix.

The graphical illustrations of FIG. 3 represent various waveforms appearing in the matrix energizing system of FIG. 2. Accordingly, FIG. 3(*a*) represents an electrical signal train which may be applied to the terminal 12 and FIG. 3(*b*) represents a series of timing pulses which may be applied to the terminal 13. Since the electrical signal train of FIG. 3(*a*) has a binary value equal to one during the first 10 microsecond digital position, a signal is passed by the "AND" circuit 15A to the single shot multivibrator 16A in the first bit line energizing circuit to generate an extended length pulse as illustrated in FIG. 3(*c*).

In contrast, the electrical signal train of FIG. 3(*a*) has a binary value equal to zero during the second 10 microsecond digital position so that no signal is passed by the "AND" circuit 15B of the second bit line energizing circuit and no extended length pulse is generated as indicated in FIG. 3(*d*). However, during the third 10 microsecond digital position of the electrical signal train of FIG. 3(*a*), the binary value is equal to one and, as indicated in FIG. 3(*e*), an extended length energizing pulse is generated commencing approximately 20 microseconds later than the energizing pulse in the first bit line energizing circuit illustrated in FIG. 3(*c*). In a similar fashion, FIG. 3(*f*) illustrates the generation of an extended length pulse in a fourth bit line energizing circuit in response to the binary one value of the electrical signal train of FIG. 3(*a*) in the fourth digital position.

FIG. 3(*g*) illustrates the pulses taken from the last stage of the bit line ring counter 14 for energizing the single shot multivibrators 30–32 for generating the character line energizing pulses. FIG 3(*h*) illustrates the waveform appearing at the output of the single shot multivibrator 30 for application to the even-numbered character lines. As illustrated, the length of each pulse is 400 microseconds with a 30 microsecond period between pulses. Thus, the repetition rate of the pulse of FIG. 3(*h*) is 430 microseconds, corresponding to forty-two digital positions in the electrical signal train and an additional 10 microsecond period separating groups of digital information appearing in the electrical signal train applied to the terminal 12. FIG. 3(*i*) illustrates the waveform appearing at the output of the single shot delay multivibrator 31. As noted above, the multivibrator 32 is driven by the trailing edge of each pulse from the delay multivibrator 31. Accordingly, FIG. 3(*j*) illustrates the delayed 400 microsecond character line energizing pulses supplied by the multivibrator 32 for application to the odd-numbered character lines in the system of FIG. 2.

For convenience of illustration, the various waveforms of FIG. 3 are not dimensionally accurate with respect to time due to the fact that the extended length pulses are respectively 21 times and 40 times longer than a single digital position in the electrical signal train of FIG. 3(*a*). Accordingly, break marks have been included in the graphical illustration to represent the passage of time and legends have been placed on the drawings to indicate the length of each pulse and the time interval prior to the commencement of and between pulses.

By means of the character line energizing circuit of FIG. 2, the character lines 22–25 are sequentially energized by pulses which overlap in time so that each of the capacitor elements may receive extended length energizing pulses for actuation having a duration many times longer than the time interval of a digital position in the electrical signal train applied to the terminal 12. By separting the bit lines into at least two groups (more groups may be employed if desired) no two of the character lines need be energized at a time when its associated group of bit lines is receiving extended length energizing pulses. Accordingly, no two of the capacitor elements are capable of being energized from a single bit of information so that no ambiguity in entry of the digital information is produced by the extension of the charging interval of each of the capacitor elements. By means of the extension in charging time, the current and power requirements of the energizing circuits are substantially reduced so that inexpensive conventional electronic components having a low power capacity may be employed for entry of the information into the matrix.

By means of the matrix energizing system of the invention, there is provided an improved apparatus for the entry of information in a matrix comprising a large number of elements at a high rate of speed. Due to the extension of the energizing pulses, the peak current requirements of the energizing circuits is substantially reduced. In addition, the provision of isolating devices connected serially with the elements in the matrix automatically disconnects the elements from the energizing circuits after being actuated. It should be understood that the illustrative arrangements of the invention of FIGS. 1 and 2 are given as examples only of one way in which the invention may be used to advantage. Accordingly, the invention should not be limited to the particular structure set forth herein, but should be given the full benefit of any and all equivalent arrangements falling within the scope of the annexed claims.

What is claimed is:

1. A matrix system including two interrelated matrices, each comprised of "bit line" rows and "character line" columns, each matrix having its rows and columns interconnected by capacitor element crosspoints, input terminal means for receiving an electrical signal train in which the value of the signal train at successive intervals of time represents serial binary information, switching means connected to the input terminal means, and the column and row lines of both of said matrices, for establishing circuits to successive selected ones of said capacitor elements corresponding to successive digital positions in the electrical signal train, said switching means including means to charge said selected capacitor means for a time period substantially in excess of the time interval allotted to a digital position in the electrical signal train, and further including means to successively select ones of said capacitor elements from each of said matrices whereby capacitor elements in both matrices are being charged at a given time.

2. A matrix system including two interrelated matrices, each comprised of "bit line" rows and "character line" columns, each matrix having its rows and columns interconnected by capacitor element crosspoints, input terminal means for receiving an electrical signal train in which the value of the signal train at successive intervals of time represents serial binary information, switching means connected to the input terminal means, and the column and row lines of both of said matrices, said switching means establishing circuits to successive capacitor elements in correspondence to successive digital positions in the electrical signal train, said circuits being successively established at each row line for a given character line and then for a different character line, said switching means including means to charge said selected capacitor elements for a time period substantially in excess of the time interval allotted to a digital position in the electrical signal train and further including means to successively select ones of said capacitor elements from each of said matrices whereby capacitor elements in both matrices are being charged at a given time.

3. A matrix system including two interrelated matrices, each comprised of "bit line" rows and "character line" columns, each matrix having its rows and columns interconnected by capacitor element crosspoints, input terminal means for receiving an electrical signal train in which the amplitude of the signal in the signal train at successive equal intervals of time represents the value of successive digital positions in a serial binary train of information, switching means connected to receive the signal train, and connected to the column and row lines of both of said matrices, for establishing charging circuits to successive selected ones of said capacitor elements corresponding to successive digital positions in the electrical signal train, said switching means including means coupled to the bit line rows to charge said selected capacitor elements for a time interval substantially in excess of the time interval allotted to a digital position in the electrical signal train, said switching means further including means coupled to the character line columns to successively select ones of said capacitor elements from each of said matrices, whereby capacitor elements in both matrices are being charged at a given time, and means coupled to said switching means and operating at the rate of the electrical signal train for controlling the switching times of said switching means.

4. A matrix energizing system including the combination of a source of serial information in the form of an electrical signal train having a plurality of successively appearing digital positions in each of which the value of the electrical signal train represents information, two interrelated matrices, each comprised of "bit line" rows and "character line" columns, a plurality of capacitor elements, each interconnecting a different row and column crosspoint in the matrices, gating means coupled to receive the electrical signal train, a plurality of bit line energizing circuits connected to the bit line rows in the matrices, each of the bit line energizing circuits including means to charge a selected capacitor element for a time period substantially in excess of the time interval allotted to a digital position in the electrical signal train, switching means connected to the gating means for establishing circuits to successive individual ones of said capacitor elements corresponding to successive digital positions in the electrical signal train, and a plurality of character line energizing circuits connected to the character line columns in the matrices, and controlled by the switching means to successively select ones of said capacitor elements from each of said matrices whereby capacitor elements in both matrices are being charged at a given time.

5. A matrix system including two interrelated matrices, each comprised of a plurality of "bit line" rows and "character line" columns, each matrix having its rows and columns interconnected by capacitor element crosspoints, a source of serial information in the form of an electrical signal train having a plurality of successively appearing digital positions in each of which the value of the electrical train represents information, a plurality of bit line charging circuits each connected to a different one of the bit line rows, a plurality of character line charging circuits, each connected to a different one of the character line columns, switching means connected to the source of serial information and to the bit line and character line charging circuits, said switching means establishing circuits to successive capacitor elements in correspondence to successive digital positions in the electrical signal train, said circuits being successively established in each bit line associated with a given character line of one matrix and then for each bit line associated with a character line of a different matrix, said bit line charging circuits including means to charge said selected capacitor elements for a time interval which is approximately equal to the product of the interval between successive pulses in the electrical signal train times the number of bit line rows in a character line column, said switching means further including means to successively select ones of said capacitor elements from each of said matrices whereby capacitor elements in both matrices are being charged at a given time.

References Cited in the file of this patent

UNITED STATES PATENTS

| | | |
|---|---|---|
| 2,536,228 | Ruysdael et al. | Jan. 2, 1951 |
| 2,677,725 | Shuler | May 4, 1954 |
| 2,691,728 | Noble et al. | Oct. 12, 1954 |
| 2,828,447 | Mauchley | Mar. 25, 1958 |